United States Patent
Raboin

(10) Patent No.: US 10,092,889 B2
(45) Date of Patent: *Oct. 9, 2018

(54) ELEMENT FOR EJECTING GAS INTO A REGENERATOR OF A FLUID CATALYTIC CRACKING UNIT

(71) Applicant: Total Raffinage Chimie, Courbevoie (FR)

(72) Inventor: Jean-Christophe Raboin, Chaumont sur Tharonne (FR)

(73) Assignee: Total Raffinage Chimie, Courbevoie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/326,684

(22) PCT Filed: Jul. 23, 2015

(86) PCT No.: PCT/EP2015/066891
§ 371 (c)(1),
(2) Date: Jan. 17, 2017

(87) PCT Pub. No.: WO2016/016088
PCT Pub. Date: Feb. 4, 2016

(65) Prior Publication Data
US 2017/0203271 A1 Jul. 20, 2017

(30) Foreign Application Priority Data
Jul. 28, 2014 (FR) ...................................... 14 57252

(51) Int. Cl.
*B01J 8/18* (2006.01)
*B01J 19/02* (2006.01)
(Continued)

(52) U.S. Cl.
CPC ............. *B01J 8/1827* (2013.01); *B01J 19/02* (2013.01); *B28B 1/52* (2013.01); *B28B 11/041* (2013.01);
(Continued)

(58) Field of Classification Search
CPC ..... B01J 19/02; B01J 4/002; B01J 8/44; B01J 8/1827; B01J 8/1872; B01J 2208/00902;
(Continued)

(56) References Cited

U.S. PATENT DOCUMENTS 3,661,177 A  5/1972  Moss et al.
4,207,682 A * 6/1980  Kline .......................... B01J 8/44
                                                    239/559

(Continued)

FOREIGN PATENT DOCUMENTS

CN     101104814 A    1/2008
EP       0222953 A1    5/1987
(Continued)

OTHER PUBLICATIONS

International Search Report issued in PCT/EP2015/066891, dated Oct. 14, 2015, 5 pages.

*Primary Examiner* — Lessanework Seifu
(74) *Attorney, Agent, or Firm* — Albert Shung

(57) ABSTRACT

An injection element (10) for a gas injection system (1) inside a regenerator of a fluid catalytic cracking unit, said injection element defining a flow passage (12) and being arranged so as to be able to be fastened to a support (11) so that said flow passage opens on one side into a cavity and on the other side into a fluidized catalyst bed,
characterized in that
said injection element is made of ceramic material.

11 Claims, 1 Drawing Sheet

(51) Int. Cl.
| | |
|---|---|
| *C04B 35/80* | (2006.01) |
| *C04B 35/628* | (2006.01) |
| *C04B 35/64* | (2006.01) |
| *C10G 11/18* | (2006.01) |
| *B28B 11/04* | (2006.01) |
| *B28B 11/06* | (2006.01) |
| *B28B 1/52* | (2006.01) |

(52) U.S. Cl.
CPC ........ B28B 11/06 (2013.01); C04B 35/62873 (2013.01); C04B 35/64 (2013.01); C04B 35/806 (2013.01); C10G 11/18 (2013.01); *B01J 2208/00902* (2013.01); *B01J 2219/0263* (2013.01); *C04B 2235/3826* (2013.01); *C04B 2235/5208* (2013.01); *C04B 2235/6028* (2013.01)

(58) Field of Classification Search
CPC ............ B01J 2208/00938; C04B 35/80; C04B 35/803; C04B 35/806; C04B 35/83; C04B 35/62873; C04B 35/6847; C04B 35/6852; C04B 35/6855
See application file for complete search history.

(56) References Cited

U.S. PATENT DOCUMENTS

| | | |
|---|---|---|
| 5,906,799 A | 5/1999 | Burgie et al. |
| 6,197,265 B1 | 3/2001 | Wheelock |
| 2008/0143005 A1* | 6/2008 | Lim ...................... C04B 35/565 264/29.2 |
| 2014/0017137 A1 | 1/2014 | Sansegundo-Sanchez et al. |

FOREIGN PATENT DOCUMENTS

| | | |
|---|---|---|
| EP | 0329494 A1 | 8/1989 |
| FR | 1280442 | 12/1961 |
| WO | 2012119805 A1 | 9/2012 |
| WO | 2012152920 A1 | 11/2012 |

* cited by examiner

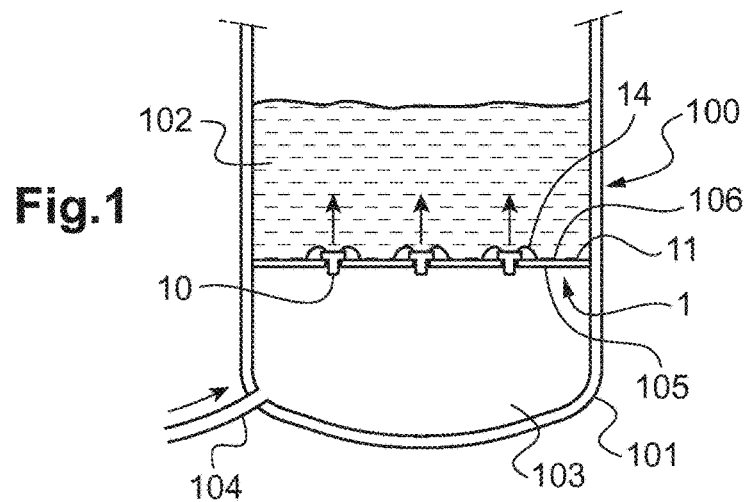
Fig.1
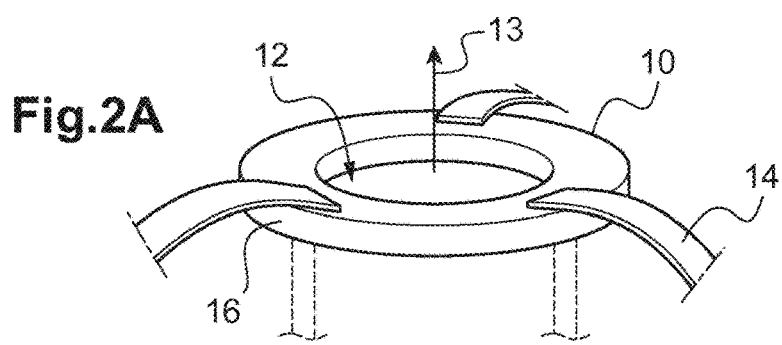
Fig.2A
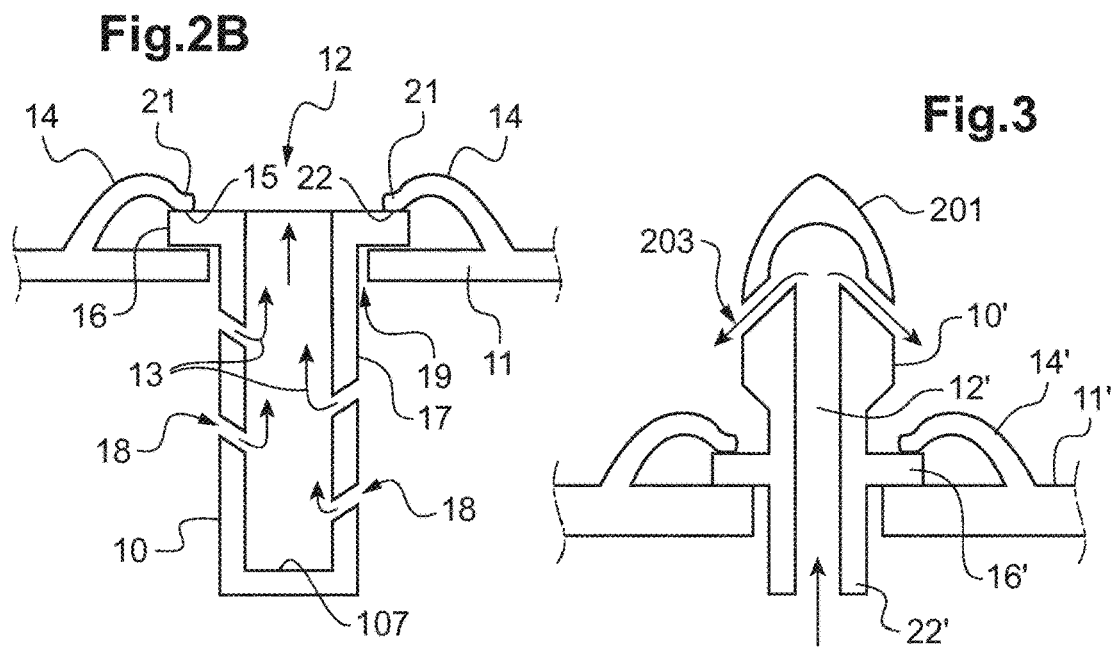
Fig.2B
Fig.3

ELEMENT FOR EJECTING GAS INTO A REGENERATOR OF A FLUID CATALYTIC CRACKING UNIT

CROSS-REFERENCE TO RELATED APPLICATIONS

This application claims the benefit of PCT/EP2015/066891, filed Jul. 23, 2015, which claims priority from FR 1457252 filed Jul. 28, 2014.

The invention relates to the injection of gas, for example air, into a regenerator of a fluid catalytic cracking (FCC) unit.

Fluid catalytic cracking is an oil refining process that consists in reducing the size of hydrocarbon molecules by action of temperature in the presence of a solid catalyst, for example of alumina. This catalyst is held in a fluidized state and circulates continuously inside the cracking unit by passing from a reaction zone to a regeneration zone.

In the reaction zone, the feedstock to be treated and the catalyst are introduced together into a substantially vertical tubular reactor, which may have ascending flow, customarily known as a riser reactor, or have descending flow, customarily known as a downer reactor. The temperature of the reactor may achieve several hundreds of degrees centigrade, for example from 520° C. to 550° C.

In the regeneration zone, a regenerator comprises a chamber in which the coke deposited on the catalyst by the cracking of the feedstock is burnt. This combustion of the coke makes it possible to restore the catalyst's activity and provides it with the energy needed for heating, vaporizing and cracking the feedstock supplied in the tubular reactor.

The combustion reaction of the coke requires a supply of oxygen. This is mainly provided by air. The combustion carried out inside the regenerator may be complete or partial depending on whether all of the coke is burnt or not. This reaction produces carbon dioxide. The catalyst thus regenerated is supplied to the inlet of the tubular reactor.

The temperature in the regenerator is of the order of 600° C. to 700° C.

Air injection systems exist for providing the air necessary for the combustion of the coke, that are designed so as to ensure a relatively uniform and stable fluidization of a catalyst bed. For example, a perforated plate system is known that supports the whole of the flow area of the catalyst bed. Pressurized air goes through the perforated plate from the bottom to the top, by passing through injection nozzles of the perforated plate.

These nozzles, made from special steels, having an improved abrasion resistance, must nevertheless be regularly replaced owing to relatively high abrasion. The erosion of the steel by the catalyst is indeed capable of leading to a failure of the injection nozzles and/or, in particular when catalyst goes back inside the nozzles, an abrasion of the inner walls of the nozzles or of an air injection cavity upstream of the plate, which risks being detrimental to the performances of the regenerator.

These nozzles made of special steels are sometimes subjected to a surface treatment intended to improve their erosion resistance, for example by a deposition of titanium nitride. This deposition is generally of the order of several tens to several hundreds of μm. However, while the erosion of such a coating is slow, considering its hardness, it is observed that when the coating is completely eroded, the erosion of the support metal is then very rapid and leads to the destruction of the nozzle.

Another method, enabling deposits of erosion-resistant materials over greater thicknesses than above, is described in detail in the published patent application CN101104814, which describes a composite nozzle taking the form of a cylindrical tube section, comprising a ceramic portion, a transition layer and an austenitic steel portion. The ceramic described is an alpha-alumina. The process for manufacturing the nozzle comprises (1) a first deposition of a mixture of alumina and iron in order to form a transition layer on the inner surface of the cylindrical tube section, then (2) a deposition of a ceramic such as alumina over a thickness of around 3 to 10 mm by centrifugation on the transition layer. The inventors claim a doubling of the service life in an FCC unit at a temperature of 800° C.

Despite the improvements reported in the literature, there is therefore a need for a system for which the maintenance could be less restrictive.

An injection element is proposed for a gas injection system inside a regenerator of a fluid catalytic cracking unit. This injection system comprises a support defining at least one orifice, this support comprising a wall defining at least one portion of a cavity and having a first face intended to be in contact with the gas contained in this cavity, and the support comprising a second face, opposite the first face, intended to be in contact with a fluidized catalyst bed. This injection element defines a flow passage and is arranged so as to be able to be firmly attached to the support, at the orifice, so that gas from the cavity can circulate via the flow passage to the fluidized catalyst bed. According to the invention, this injection element is made of ceramic material.

Such an injection element, for example an injection nozzle, may have a relatively high resistance to the abrasion caused by the stream of catalyst passing in contact with the injection element via a vortex effect, so that this injection element may be replaced less often than in the prior art.

In addition, the design constraints, in particular the constraints linked to the erosion induced by the catalyst particles, may be less important than in the prior art. It is thus possible to design gas injection elements with an optimized shape in order to enable a better distribution of the gas within the regenerator, which may thus make it possible to better maintain the quality of the catalyst. In particular, the number and intensity of the hot spots within the regenerator will be able to be reduced with respect to the prior art.

In addition, the weight of this injection element may be lower than the weight of a steel injection element of the type known from the prior art.

In addition, the injection element may be designed with a flow passage that offers a wider effective cross section than in the prior art, so that the number of injection elements and/or the pressurization of the gas in the cavity may be reduced.

Thus, one feature of the invention lies in the fact that the injection element is manufactured entirely from a ceramic material. The injection element is thus made of ceramic, at least as regards its main elements, to which a hollow cylindrical body defining the flow passage for the gas belongs.

Ceramic materials have a relatively high hardness, namely a hardness of at least 1400 N/mm$^2$ as Vickers hardness. Preferably, the ceramic material has a hardness of greater than 2100 N/mm$^2$ or even greater than 2500 N/mm$^2$.

Ceramic materials have proved suitable for the usage conditions of an FCC unit. In particular, these materials may have good corrosion resistance and thermal resistance.

Preferably, the ceramic material may be selected from silicon carbide SiC, boron carbide $B_4C$, silicon nitride $Si_3N_4$, aluminium nitride AlN, boron nitride BN, alumina $Al_2O_3$, or mixtures thereof. Preferably, the ceramic material is silicon carbide SiC.

Preferably, the ceramic material is silicon carbide SiC or comprises silicon carbide SiC, preferably in a majority amount, for example in a content of 60% to 99.9% by weight. Silicon carbide has the advantage of possessing good mechanical and physical properties for a reasonable manufacturing cost.

As a variant, or optionally in combination, the ceramic material may comprise a ceramic matrix, for example selected from silicon carbide SiC, boron carbide $B_4C$, silicon nitride $Si_3N_4$, aluminium nitride AlN, boron nitride BN, alumina $Al_2O_3$, or mixtures thereof. Incorporated in this ceramic matrix are fibres, for example carbon fibres, ceramic fibres, a mixture of these fibres, or other fibres.

The ceramic material is then a composite material. Such a composite material may be advantageous for the injection elements subjected to stretching and shear stresses. In particular, the fibres may be positioned randomly (pseudo-isotropically) or anisotropically. When they are present, these fibres may represent from 0.1% to 10% by weight of the composite material.

The carbon fibres may be carbon fibres with graphite planes oriented along the fibre.

The ceramic fibres may be selected from crystalline alumina fibres, mullite ($3Al_2O_3$, $2SiO_2$) fibres, crystalline or amorphous silicon carbide fibres, zirconia fibres, silica-alumina fibres, or mixtures thereof.

For example, the composite ceramic material comprises a silicon carbide SiC matrix comprising fibres of the aforementioned type. The fibres may for example be silicon carbide fibres.

Advantageously and non-limitingly, the devices according to the invention are preferably made of CMC materials (CMC=Ceramic Matrix Composite), here identified as CMC devices. In other words, the composite material here above mentioned may be a CMC.

A method of preparation of these CMC devices is preferably performed as follows:
1) Shaping a fibrous ceramic material eventually over a supporting material that could be removed without excessive effort, in order to obtain a fibrous shape that can be assimilated to the backbone of the final device to be obtained, eventually in the presence of a first resin,
2) Coating the shape obtained at step (1) with finely divided ceramic powder and at least a second resin, eventually in the presence of finely divided carbon powder, to obtain a coated shape,
3) Eventually repeat steps (1) and (2),
4) Heating the coated shape of step (2) or (3) under vacuum and/or under inert atmosphere in order to transform the resins of step (1), (2) and eventually (3) into a carbon-rich structure, essentially deprived of other elements to obtain a carbon-rich coated shape,
5) Introducing a gas within the carbon-rich coated shape of step (4) under conditions efficient to transform the carbon-rich structure into carbide containing carbon-rich structure,
6) Eventually removing the supporting material of step (1), when present,
wherein carbon fibers are present at least at step (1), (2) and/or (3) within the fibrous ceramic material, within the finely divided ceramic powder, within the finely divided carbon powder, and/or within the first and/or second resin.

Preferably, the mixture of finely divided ceramic powder comprises ceramic fibers with lengths comprised between 100 nm to 5 mm in an amount from 0.1 to 20 Wt % relative to the total amount of finely divided ceramic powder+finely divided carbon powder when present.

Preferably, the fibrous ceramic material is made of non-woven fabric, woven fabric or knit made with at least one of thread, yarn, string, filament, cord, string, bundle, cable, eventually sewed to maintain the desired shape. The fibrous ceramic material and the resins can be present in an amount up to 50 wt % relative to the total amount of components. In these conditions, if a CMC is manufactured with 50 Wt % fibrous ceramic material and resins, and ceramic powder comprising 20 Wt % ceramic fibers is added, the overall content in free fibers, i.e. not contained in the fibrous ceramic material, before any thermal treatment, is 10 Wt %. (Wt %=weight percent).

The fibrous ceramic material is preferably made with carbon and/or silicon carbide fibers.

The first, second and further resin are independently selected among resins able to produce a carbon residue and to bind the different constituents of the ceramic material before thermal treatment. Suitable resins include preferably poly-methacrylic acid, poly methyl methacrylate, poly ethyl methacrylate, polymethacrylonitrile, polycarbonates, polyesters, polyolefins such as polyethylene and polypropylene, polyurethanes, polyamides, polyvinyl butyral, polyoxyethylene, phenolic resins, furfuryl alcohol resins, usual polymer precursors of carbon fibers such as polyacrylonitrile, rayon, petroleum pitch. The resins and their quantities are adjusted to the desired porosity that is obtained after thermal treatment of step (4) and before step (5). Preferably, the total porosity after treatment of step (4) should be comprised between 15 vol % and 25 vol %, more preferably between 20 vol % and 22 vol %. (Vol %=volume percent). Without wishing to be bound by theory, it is assumed the resins, when undergoing thermal treatment of step (4) transform into a network of cavities containing residual carbon atoms surrounded with voids. It is assumed the gas of step (5) moves preferentially within this network thus allowing improved homogeneity in the final CMC material. For example, 78 Wt % SiC powder which contains 0.2 Wt % of silicon carbide fiber is mixed with 17 Wt % phenolic resin and 5 Wt % poly methyl methacrylate and this mixture is used to impregnate and cover a silicon carbide fabric (which accounts for 20 Wt % of the overall weight) that surrounds a shaping support, then heated under inert gas atmosphere until complete carbonization of the resins to obtain a final product having from 16 vol % to 18 vol % total porosity.

The gas may be selected among $SiH_4$, $SiCl_4$, $ZrCl_4$, $TiCl_4$, $BCl_3$, to form corresponding carbide.

Preferred gas is $SiH_4$ or $SiCl_4$.

Preferred conditions of step (5) are standard RCVI conditions (Reactive Chemical Vapor Infiltration), more preferably using pulsed pressure.

Preferably steps (4) and (5) are each independently performed at a temperature comprised between 1100 and 1800° C. and at an absolute pressure comprised between 0.1 and 1 bar.

Preferably, the finely divided ceramic powder comprises, or eventually consists of, particles selected from silicon carbide SiC, boron carbide $B_4C$, silicon nitride $Si_3N_4$, aluminium nitride AlN, boron nitride BN, alumina $Al_2O_3$, or mixtures thereof.

Preferably, the finely divided carbon powder is carbon black.

A suitable but non limiting particle size range for the finely divided ceramic powder, and eventually finely divided carbon powder, is about 10 micrometers or less.

Such a method of preparation allows improved homogeneity in the CMC material in that porosity gradient and clogging at the surface of the material is considerably reduced or totally alleviated, depending on the experimental conditions (low temperatures ca. 1100-1300° C. and reduced pressure ca. 0.1-0.5 bar abs. are preferred).

Advantageously and non-limitingly, the ceramic material may be a sintered ceramic material. This may in particular facilitate the production of the injection element, whether it is made from a single part or from several parts.

With regard to the dimension of the injection elements, it is possible to produce the injection element made of solid ceramic as a single part without assembling or welding. In this case, the injection element may be formed for example by moulding or by extrusion, followed by a firing of the green injection element, under conventional operating conditions suitable for the type of ceramic produced. The firing step is optionally preceded by a drying step.

In one particular embodiment, the injection element may be made from a single part made of ceramic material, obtained by sintering. The sintering step may be preceded by a conventional shaping step, for example by compression, extrusion or injection.

Sintering is a process for manufacturing parts that consists in heating a powder without melting it. Under the effect of heat, the grains fuse together, which forms the cohesion of the part. Sintering is especially used for obtaining the densification of ceramic materials and has the following advantages:
  it makes it possible to control the density of the substance; as a powder is used to start with and since this powder does not melt, it is possible to control the size of the powder grains (particle size) and the density of the material, depending on the degree of initial compacting of the powders;
  it makes it possible to obtain materials having a controlled porosity, that are chemically inert (low chemical reactivity and good corrosion resistance) and thermally inert;
  it makes it possible to control the dimensions of the parts produced: as there is no change of state, the variations in volume and in dimensions are not very large with respect to melting (absence of shrinkage phenomenon).

In another particular embodiment, the injection element may comprise several parts made of ceramic material, assembled together.

Advantageously and non-limitingly, the inner and/or outer walls of the injection element may be smooth, in other words they may have a low surface roughness. Such smooth walls make it possible to improve the flexural strength of the injection element. Therefore, it is possible not only to design injection elements with relatively small dimensions, but also to plan to increase the gas flow rates. This may make it possible to increase the number of injection elements, and generally, to homogenize the injection of gas in the fluidized bed.

Such a smooth wall may be obtained when the ceramic material is a sintered ceramic material.

Advantageously and non-limitingly, the injection element may be obtained from a relatively fine sintering powder, for example having a mean grain diameter of less than or equal to 500 nm, which may result in relatively smooth surfaces.

Alternatively or in addition, the injection element may be obtained by adding to the main material, for example SiC, an additive selected from boron B, silicon Si and carbon C, or mixtures thereof, for example in a proportion varying from 0.3% to 2% by weight. In the case of an SiC material obtained by powder sintering, such an addition of additive may make it possible to reduce the porosity and consequently the roughness.

Advantageously and non-limitingly, the additive may comprise a mixture of boron B, silicon Si and carbon C. It may thus form additional SiC, which blocks the pores and thus reduces the roughness.

Alternatively or in addition, a step of additional deposition of SiC by chemical vapour deposition (CVD) could for example be provided.

Generally, the invention is not limited by a manufacture of the injection element so as to obtain a relatively low porosity. It will, for example, be possible to produce SiC injection nozzles with a relatively high porosity, by making provision for the pores to be filled in following depositions of carbon in the regenerator.

The injection element may have dimensions of the order of ten or so centimeters, or other dimensions. For example, an injection element may have a height of close to 15 centimeters, and a ratio between the height and the width that varies between 2 and 6. Thus, for an injection element with a nozzle of cylindrical general shape with a flange bearing against the support, the external diameter of the flange may be 5 or 6 centimeters, whereas the internal diameter of the flow passage may be 1 or 2 centimeters.

The invention is not limited to one particular flow passage shape. For example, a cylindrical flow passage, but also a flow passage with a portion of smaller cross section, could be provided. In the latter case, this nozzle shape, with a Venturi effect, may tend to limit the entry of catalyst into the flow passage.

A gas injection system is moreover proposed for injecting gas into a regenerator of a fluid catalytic cracking unit, this system comprising at least one injection element as described above and the support.

The catalyst may be alumina, or another catalyst.

The gas may be air, or another gas.

The invention is not limited to one particular shape of the support. The support may comprise a single wall separating the air cavity from the catalyst bed, or else several walls, for example two superposed walls. In the latter case, the first surface of the support, in contact with the air cavity, may be a lower surface of the lower wall, and the second surface, in contact with the fluidized bed, may be an upper surface of the upper wall.

The support may comprise a wall of the chamber of the regenerator itself, in which case the injection element may be mounted on the regenerator, but advantageously, the support is designed to be introduced inside the regenerator.

For example, a plate could be provided that supports the fluidized bed and that covers the whole of a cross section of the chamber of the regenerator, so as to form a cavity at the bottom of the regenerator, it being possible for this plate to be flat, concave, convex, or other. The plate is advantageously made of a material having a coefficient of thermal expansion close to that of the walls of the chamber of the regenerator, for example made of steel, in order to ensure a relatively good leaktightness between the perimeter of the plate and the chamber.

Alternatively, it will be possible to provide a duct, intended to be immersed in the fluidized bed, and defining a cavity inside the duct for the gas supply. The outer surfaces of this duct are thus intended to be in contact with the fluidized bed. For example, the invention could be carried out on a pipe grid.

The invention is not limited to one particular shape of the injection element either.

It will be possible, for example, to provide injection elements that define a straight flow path of the gas, with for example a cylindrical flow passage open over an entire cross section of this flow passage towards the fluidized bed and/or towards the cavity, or else injection elements that define a more complex flow path of the gas, with bends for example.

The latter injection elements may prove advantageous in the sense that with such a complex path the catalyst circulating in the opposite direction to that of the air runs less risk of reaching the cavity, even if the pressure drop on either side of the support remains relatively limited.

In particular, the injection element may be of the cap distributor type, that is to say that this injection element may comprise a hat portion forming an obstacle to a straight flow path of the air, and may define (one or) some transverse gas outlet orifices, so that the flow path of the air forms a bend. The hat portion makes it possible to protect the flow passage in the sense that this hat portion may form a barrier for the catalyst particles capable of penetrating into the injection element.

The injection element may define (one or) some transverse gas inlet orifices, for example oblique orifices with respect to a longitudinal direction of the flow passage. The injection element may comprise a solid bottom, closing the flow passage at its upstream end, so that the air entering into the flow passage must circulate via the oblique orifices. Thus, the catalyst particles entering into the flow passage will have a tendency to remain at the bottom of the injection element, rather than rising back up and circulating (countercurrently) via the oblique orifices. It is thus possible to limit the intrusion of catalyst into the air cavity.

In one embodiment, the injection element is shaped so that the gas circulating via the flow passage is injected via a plurality of orifices having dimensions smaller than those of the flow passage. The injection element may for example have a shower head shape.

In one embodiment, the support, especially when it is a duct, may be made of ceramic material, especially of the aforementioned type, for example SiC obtained by sintering.

In one embodiment, at least one, and preferably each, injection element is made from a single part with the support.

Alternatively, provision could be made for an assembling of the injection element(s) to the support.

The invention is in no way limited to supports made of ceramic material. It will be possible, for example, to provide a support made of metal, advantageously provided with an anti-erosion coating on its side in contact with the catalyst bed, for example made of concrete, in order to withstand the abrasion caused by the catalyst. In this case, the injection elements are advantageously shaped so that their end opens above the anti-erosion coating of the side of the plate in contact with the catalyst bed.

Advantageously and non-limitingly, for at least one and preferably each injection element, the injection system comprises a device for fastening this injection element to the support, said device being capable of absorbing a difference in expansion between the material of the support, for example metal, and the ceramic material of this injection element.

For example, the fastening device may be formed by a layer of materials essentially comprising assembled ceramic fibres having a non-zero elastic modulus, this layer being positioned between a portion made of ceramic material and a metal portion and providing the cohesion of these portions.

Alternatively, the geometry and the dimensions of the fastening device may be adapted in order to compensate for the difference in thermal expansion between the metal and the ceramic material.

Advantageously and non-limitingly, for at least one and preferably each injection element, the fastening device associated with this injection element comprises one (or more) pressing element(s) capable of exerting a force on this injection element in order to press this injection element against the support, especially when it is a plate.

Thus, the fastening withstands the differential expansion between the material of the support, for example a steel, and the material of the injection device. Indeed, the ceramic may have a coefficient of thermal expansion that is much lower than that of the steel.

The pressing element may for example comprise a spring means, or other means. It will be possible, for example, to provide one or more fastening tabs that are firmly attached to (or form a single part with) the support, for example that are welded to the support. These tabs, on the one hand welded via one end to the support, while the other end rests on a surface of the injection element, make it possible to exert an elastic bearing force on the injection element, when this is installed on the support, so as to keep this injection element pressed against the support. This other end may have a relatively flat surface in order to limit the zones of high mechanical stresses.

Advantageously and non-limitingly, the injection element may define a bearing portion, shaped to rest on at least one portion of the perimeter of an orifice of the support and advantageously over the entire perimeter of this orifice when the pressing element(s) exert(s) a force on this bearing portion.

The bearing portion may for example have a general flange shape. The bearing portion may define a bearing surface against which the pressing means exerts a force, and, on the side opposite the bearing surface, a contact surface intended to come into contact over the perimeter of the orifice of the support.

In one embodiment, it will be possible to provide a fastening spring of the type of those used for fastening halogen lamps in a dropped ceiling, which surrounds the injection element and holds this injection element on the support.

Advantageously and non-limitingly, the gas injection element may be arranged so as to prevent lateral movements beyond a certain range of movements, especially movements capable of breaking the fluid communication between the cavity and the flow passage of this gas injection element.

In particular, the injection element may define an abutment surface intended to abut against the edge of the orifice in the event of lateral movement.

The flow passage may thus extend beyond the flange. The injection element may thus have an air inlet portion, passed through by a portion of the flow passage, and intended to extend into the thickness of the support when the pressing means exert a force against the bearing portion.

This air inlet portion may have a diameter smaller than the diameter of the orifice so as to be able to make up for the dimensional variations of the orifice linked to the expansion of the steel of the support.

The invention is in no way limited by the shape of this air inlet portion, provided that it is capable of being placed in the orifice of the support. This air inlet portion may thus have a cylindrical shape or other shape. In particular, it will be possible to provide a conical shape in order to facilitate the positioning of the injection element before the installation of the pressing elements.

The invention is not limited by the shape of the pressing element(s) either. Advantageously, it will be possible to provide tabs, for example made of steel, advantageously made of abrasion-resistant steel. These tabs extend between two ends, one of the ends being fastened to the support, and the other of the ends being intended to come to rest on a bearing surface of the injection element.

A process is also proposed for installing a gas injection element for a regenerator of a catalytic cracking unit, this injection element being made of ceramic material and defining a flow passage, the process comprising a step of positioning the injection element at an orifice of a support, so that the flow passage of the injection element opens on either side of the support.

The process may advantageously additionally comprise a step of installing one or more pressing element(s) arranged to exert a force on a bearing surface of the injection element, so that the injection element is held pressed against the support.

A process is additionally proposed for manufacturing a gas injection element for a regenerator of a catalytic cracking unit, so that this element defines a flow passage for the gas, intended to open on one side into a cavity and on the other side into a fluidized bed, the process being characterized in that the injection element is made of ceramic material.

The process could advantageously comprise a sintering step.

The invention will be better understood with reference to the figures, which show exemplary embodiments of the invention.

FIG. 1 shows an example of a portion of a regenerator with an example of an air injection system according to a first embodiment of the invention.

FIGS. 2A and 2B are views, respectively in perspective and in cross section, of an example of an air injection element according to the first embodiment of the invention, when installed on a plate-type support.

FIG. 3 is a cross-sectional view of an example of an air injection element according to a second embodiment of the invention.

Identical references may be used from one figure to the next to denote elements that are identical or similar in their shape or in their function.

With reference to FIG. 1, a regenerator 100 is part of a fluid catalytic cracking (FCC) unit not represented in its entirety. In this regenerator, the combustion of coke deposited on catalyst resulting from a reactor of the FCC unit is carried out.

The catalyst in the chamber 101 of the regenerator 100 forms a fluidized bed 102.

An injection system 1 makes it possible to inject air into this fluidized catalyst bed 102, and therefore the oxygen needed for the combustion of the coke.

This injection system 1 comprises a support, here a perforated plate 11, occupying the whole of a cross section of the chamber 101, and supporting the fluidized bed 102. This plate defines, with the bottom walls of the chamber, an air cavity 103. A duct 104 that opens into this cavity 103 makes it possible to provide pressurized air.

The plate thus comprises a first face 105 in contact with the air of the cavity 103 and a second face 106 in contact with the fluidized bed 102.

The perforated plate 11 is made of steel. An anti-erosion coating made of concrete, not represented, additionally makes it possible to protect the plate from the abrasion linked to the catalyst present in the regenerator. For example, concrete is poured onto a steel mesh, not represented, for example having a honeycomb shape comprising a plurality of hexagonal cells firmly attached to one another by their sides (hex mesh), or other mesh.

Mounted on each orifice (reference 19 in FIG. 2B) of the plate 11 is a gas injection element, here an air injection nozzle 10, with the aid of tabs 14, or flanges, welded to the plate 11.

The injection nozzle 10 is made of ceramic, for example made of silicon carbide SiC. It is for example formed by injection moulding or extrusion. Injection moulding or extrusion are conventionally carried out using ceramic powders or precursors of ceramics with a binder. According to another manufacturing method, the ceramic nozzle 10 is formed by compression and heating of a ceramic powder, it being possible for the compression to be maintained during the heating step, the heating step being a step of sintering the ceramic powder. This technique is particularly well suited to the manufacture of solid elements made of silicon carbide according to the invention. The ceramic powder used optionally comprises ceramic fibres in order to increase the mechanical strength of the parts produced. The ceramic fibres, when they are present, generally represent from 0.1% to 10% by weight of the part produced.

Such a nozzle, made of solid ceramic, has a relatively low manufacturing cost and does not result in a significant additional cost with respect to a steel having a surface treatment, or a special steel having an improved abrasion resistance.

With reference to FIGS. 2A and 2B, the injection nozzle 10 defines a flow passage 12 in which air is intended to circulate from the air cavity to the catalyst bed, according to the arrows 13.

Pressing elements 14, here steel tabs welded to the plate 11, make it possible to exert a pressing force on a bearing surface 15 of a flange 16 of the injection nozzle 10.

Thus, the other side of the flange 16 is pressed against the perimeter of the edge of the orifice 19 corresponding to this nozzle 10.

If temperature variations lead to a variation in the dimensions of this orifice, the fastening of the injection nozzle 10 thus remains stable despite the possible expansion of the support 11 when the temperature varies.

When it is present, the anti-erosion coating may cover the pressing elements 14, it is thus preferable to increase the height of the walls defining the flow passage 12 so that the concrete does not cover it. However, it may be advantageous for the anti-erosion coating not to cover the pressing elements 14 in order to allow a free expansion of the various materials. In this case, it is not necessarily useful to increase the height of the walls of the injection nozzles 10.

The nozzle 10 additionally comprises an air inlet portion 17 intended to be received inside the orifice 19. This air inlet portion 17 has a cylindrical general shape in this embodiment.

The diameter of this portion 17 is smaller than the diameter of the orifice 19, so that the expansion of the plate 11 does not lead to a fracture of the injection nozzle 10.

The tabs 14 are welded to the plate 11, each tab 14 comprising an end 21 intended to exert an elastic bearing force on the flange 16. Each end 21 comprises a flat side 22 in order to avoid regions of excessively high stresses on the flange 16 of the nozzle 10.

The tabs 14 act like a spring in order to press the nozzle 10 against the walls of the plate 11.

In one embodiment that is not represented, the air inlet portion could have a conical shape in order to facilitate the pre-positioning of the nozzle during the installation of this nozzle.

In the first embodiment, illustrated by FIGS. 1 to 2B, the air inlet portion 17 of the nozzle 10 defines oblique orifices 18. The flow path of the air thus forms bends, which is not really a hindrance in terms of pressure drop. On the other hand, the catalyst particles falling into the flow passage 12 from the catalyst bed will have a tendency to remain in the bottom 107 of the nozzle 10, this bottom being solid, rather than reaching the air cavity via these oblique orifices 18. This type of air inlet portion may be advantageous in so far as the walls of the air cavity may be devoid of abrasion-resistant concrete coating.

The oblique orifices are positioned slightly offset from one another, so that the pressurized air entering the nozzle 10 has a tendency to form a vortex, with a view to discharging any possible catalyst particles present in the bottom 107 of the nozzle 10 to the fluidized bed.

With reference to FIG. 3, the injection nozzle 10', here represented held on a plate 11' with the aid of tabs 14' bearing against a flange 16' of the nozzle, comprises a hat portion 201 covering a flow passage 12', so that the air circulating via this flow passage 12' is injected towards the catalyst bed via oblique outlet orifices 203, according to the arrows 203.

This type of nozzle may make it possible to limit the entry of catalyst particles into the nozzle.

The flow passage 12' may thus have a cross section of relatively large dimensions, which may be advantageous in the sense that the requirements in terms of pressurization of the air may then be lower than when the nozzles have cross sections of smaller dimensions, and/or in the sense that fewer injection nozzles than in the prior art could be provided.

In one variant that is not represented, the air outlet portion from the second embodiment, with a portion that forms a hat, could of course be combined with the air inlet portion from the first embodiment.

The invention may make it possible to design nozzles 10 with greater freedom of design as regards the shape in so far as it is less necessary than in the prior art to take into account the problem of erosion by the catalyst.

In particular, a shape could be provided that makes it possible to optimize the injection of air, which may make it possible to improve the combustion quality, and therefore to further preserve the catalyst, which may be beneficial for the environment.

In addition, the maintenance operations, capable of imposing shutdowns and/or of limiting catalytic cracking, may be carried out less frequently than in the prior art.

Finally, this type of injection system may prove more reliable than in the prior art and therefore may make it possible to limit the risk of unscheduled catalytic cracking shutdown.

The invention claimed is:

1. An injection element for a gas injection system inside a regenerator of a fluid catalytic cracking unit, the gas injection system comprising a support defining at least one orifice, this support comprising a wall defining at least one portion of a cavity and having a first face intended to be in contact with the gas contained in this cavity, and the support comprising a second face, opposite the first face, intended to be in contact with a fluidized catalyst bed, wherein the injection element comprises a flow passage and is arranged so as to be able to be firmly attached to the support, at the orifice, so that gas from the cavity can circulate via the flow passage to the fluidized catalyst bed, characterized in that the injection element is made of a ceramic material comprising a ceramic matrix and carbon and/or ceramic fibres incorporated into this ceramic matrix, wherein the ceramic material comprises silicon carbide in a majority amount.

2. The injection element according to claim 1, in which the ceramic material is a Ceramic Matrix Composite (CMC).

3. A gas injection system for injecting gas into a regenerator of a fluid catalytic cracking unit, the gas injection system comprising:
   at least one injection element, and
   a support defining at least one orifice, this support comprising a wall defining at least one portion of a cavity and having a first face intended to be in contact with the gas contained in this cavity, and the support comprising a second face, opposite the first face, intended to be in contact with a fluidized catalyst bed, in which the injection element defines a flow passage and is arranged so as to be able to be firmly attached to the support, at the orifice, so that gas from the cavity can circulate via the flow passage to the fluidized catalyst bed, characterized in that the injection element is made of a ceramic material comprising a ceramic matrix and carbon and/or ceramic fibres incorporated into this ceramic matrix, wherein the ceramic material comprises silicon carbide in a majority amount.

4. The gas injection system according to claim 3, in which, for at least one injection element, the injection system comprises a device for fastening the injection element to the support, the fastening device being capable of absorbing a difference in expansion between the material of the support and the ceramic material of the injection element.

5. The gas injection system according to claim 4, in which, for at least one injection element, the fastening device comprises at least one pressing element capable of exerting a force on this injection element in order to press this injection element against the support.

6. The gas injection system according to claim 5, in which the pressing element comprises a tab welded via one end to the support and of which the other end is capable of exerting an elastic bearing force on the injection element when the injection element is installed on the support.

7. The gas injection system according to claim 3, in which the support comprises a perforated plate arranged to cover the whole of a cross section of a chamber of the regenerator in order to support the fluidized catalyst bed.

8. The gas injection system according to claim 3, wherein the ceramic material comprises silicon carbide SiC, preferably in a majority amount.

9. The gas injection system according to claim 3, wherein the ceramic material is a Ceramic Matrix Composite (CMC).

10. A process for manufacturing a gas injection element for a regenerator of a fluid catalytic cracking unit, so that this element defines a flow passage for the gas, intended to open on one side into a cavity and on the other side into a fluidized bed, the process being characterized in that the injection element is made of ceramic material comprising a ceramic matrix and carbon and/or ceramic fibres incorporated into this ceramic matrix, wherein the process comprises:
   1) shaping a fibrous ceramic material over a supporting material that could be removed without excessive effort, in order to obtain a fibrous shape that can be assimilated to the backbone of the final device to be obtained, in the presence of a first resin,
2) coating the shape obtained at step (1) with finely divided ceramic powder and at least a second resin, in the presence of finely divided carbon powder, to obtain a coated shape,
3) repeat steps (1) and (2),
4) heating the coated shape of step (2) or (3) under vacuum and/or under inert atmosphere in order to transform the resins of step (1), (2) and (3) into a carbon-rich structure, essentially deprived of other elements to obtain a carbon-rich coated shape,
5) introducing a gas within the carbon-rich coated shape of step (4) under conditions efficient to transform the carbon-rich structure into carbide containing carbon-rich structure,
6) removing the supporting material of step (1), when present, wherein carbon fibers are present at least at step (1), (2) and/or (3) within the fibrous ceramic material, within the finely divided ceramic powder, within the finely divided carbon powder, and/or within the first and/or second resin.

11. The manufacturing process according to claim 10, comprising a step of sintering silicon carbide SiC particles.

* * * * *